US012203310B2

United States Patent
(12) United States Patent
Reddmann

(10) Patent No.: US 12,203,310 B2
(45) Date of Patent: Jan. 21, 2025

(54) OPENING APPARATUS FOR A MOTOR VEHICLE DOOR ELEMENT

(71) Applicant: Kiekert AG, Heiligenhaus (DE)

(72) Inventor: Uwe Reddmann, Essen (DE)

(73) Assignee: Kiekert AG, Heiligenhaus (DE)

(*) Notice: Subject to any disclaimer, the term of this patent is extended or adjusted under 35 U.S.C. 154(b) by 706 days.

(21) Appl. No.: 17/297,495

(22) PCT Filed: Nov. 29, 2019

(86) PCT No.: PCT/DE2019/101022
§ 371 (c)(1),
(2) Date: May 27, 2021

(87) PCT Pub. No.: WO2020/125853
PCT Pub. Date: Jun. 25, 2020

(65) Prior Publication Data

US 2022/0034144 A1 Feb. 3, 2022

(30) Foreign Application Priority Data

Dec. 18, 2018 (DE) ..................... 10 2018 132 666.1

(51) Int. Cl.
*E05F 15/603* (2015.01)
*E05C 17/00* (2006.01)

(52) U.S. Cl.
CPC .......... *E05F 15/603* (2015.01); *E05C 17/003* (2013.01); *E05Y 2201/41* (2013.01);
(Continued)

(58) Field of Classification Search
CPC ...... E05C 17/003; E05C 17/08; E05C 17/085; E05F 15/41; E05F 15/603; E05F 15/619
See application file for complete search history.

(56) References Cited

U.S. PATENT DOCUMENTS 3,419,798 A * 12/1968 Walton .................. H10N 52/00
257/E43.002
2002/0117985 A1* 8/2002 Buchheit ................ H02K 11/24
318/445
(Continued)

FOREIGN PATENT DOCUMENTS

DE 10331633 A1 2/2005
DE 102008045904 B3 11/2009
(Continued)

OTHER PUBLICATIONS

Translation of International Search Report issued Mar. 6, 2020, for International Patent Application No. PCT/DE2019/101022.

*Primary Examiner* — Gregory J Strimbu
(74) *Attorney, Agent, or Firm* — Renner, Otto, Boisselle & Sklar, LLP

(57) ABSTRACT

An opening apparatus for a motor vehicle door element, the opening apparatus having an electric drive and an actuator, wherein the actuator can be displaced by the drive and a gear mechanism arranged between the actuator and the drive, such that a movement of the door element can be made possible by displacement of the actuator, and a sensor for detecting the door element movement, wherein at least one gear mechanism component of the gear mechanism is pivotably received in the opening apparatus, and the pivoting movement of the gear mechanism component can be detected by the sensor.

18 Claims, 3 Drawing Sheets

(52) U.S. Cl.
CPC ... *E05Y 2201/418* (2013.01); *E05Y 2201/426* (2013.01); *E05Y 2201/48* (2013.01); *E05Y 2400/32* (2013.01); *E05Y 2400/44* (2013.01); *E05Y 2900/531* (2013.01)

(56) References Cited

U.S. PATENT DOCUMENTS

| | | | | |
|---|---|---|---|---|
| 2009/0079203 | A1* | 3/2009 | Huang | E05C 17/085 292/64 |
| 2017/0292311 | A1* | 10/2017 | Podkopayev | E05C 17/006 |
| 2018/0155968 | A1* | 6/2018 | Miu | E05F 15/70 |
| 2018/0223583 | A1* | 8/2018 | Podkopayev | F16H 37/04 |
| 2018/0258682 | A1* | 9/2018 | Schatz | E05F 15/614 |
| 2019/0161999 | A1* | 5/2019 | Herdering | E05C 17/203 |
| 2019/0292818 | A1* | 9/2019 | Cumbo | E05B 81/77 |

FOREIGN PATENT DOCUMENTS

| | | | |
|---|---|---|---|
| DE | 102009006948 | A1 | 8/2010 |
| DE | 102011015669 | A1 | 10/2012 |
| DE | 102011055506 | A1 | 5/2013 |
| DE | 102016105760 | A1 | 10/2017 |
| DE | 102017214174 | A1 | 2/2018 |
| DE | 102018201840 | A1 | 8/2018 |
| DE | 102017124282 | A1 | 4/2019 |
| JP | 2004346706 | A | 12/2004 |

* cited by examiner

OPENING APPARATUS FOR A MOTOR VEHICLE DOOR ELEMENT

This application is a national phase of International Application No. PCT/DE2019/101022 filed Nov. 29, 2019, which claims priority to German Patent Application No. 10 2018 132 666.1 filed Dec. 18, 2018.

FIELD OF DISCLOSURE

The invention relates to an opening apparatus for a motor vehicle door element, having an electric drive and an actuating means, wherein the actuating means can be displaced by means of the drive and a gear mechanism arranged between the actuating means and the drive, and a sensor for detecting a door movement.

BACKGROUND OF DISCLOSURE

Today's motor vehicles are increasingly being provided with convenience functions. For example, in order to make it easier to get into a motor vehicle and to be able to influence the aesthetic and aerodynamic shape, motor vehicles are equipped, for example, without an outer door handle. It is also conceivable, however, that an outside door handle is provided, but this only forwards a switching signal to the motor vehicle door lock to open it. In order to facilitate and automate getting in and, for example, to enable getting into vehicles without handles on the outside of the door, so-called opening apparatuses or door opening devices are used, some of which are also referred to as door positioners.

A positioner for motor vehicle doors or flaps, by which a door, flap or hood can be moved from a closed position into an open position, is known from DE 10 2011 015 669 A1. If the positioning apparatus relates, for example, to a motor vehicle side door, the door can be opened by means of an electrical pulse. For this, the locking mechanism of the door lock must first be unlocked, preferably electrically, so that the door can be opened. If, for example, the door sealing pressure is not sufficient to move the door from the closed position into an open position, the door can be moved into an open position by means of the positioning apparatus. An open position is defined here in such a way that the operator of the motor vehicle is able to grasp the door so that he can fully open the door. An electric drive is used as the positioning device, which acts mechanically on the motor vehicle door in the form of a pivoting movement of the levers via a drive pawl and an inner and outer lever.

DE 10 2016 105 760 A1 discloses an opening apparatus for a motor vehicle door with a base plate, furthermore with a drive element mounted on the base plate and a drive, wherein a first sensor assigned to the drive element is provided which distinguishes at least between an opening process and a manual opening process. The opening apparatus comprises a drive which can be driven via a sensor and a control unit. A flexible connecting means then enables a transmission lever to be pivoted, which in turn enables an opening movement via a drive lever and a drive slide. In order to enable the door to be moved, the drive slide moves linearly and, for example, out of an opening in a body so that an unlatched and unlocked door can be opened at least in some areas. The end position of the drive slide can be detected by means of a second stationary sensor, so that the drive can again be switched off.

From the applicant's unpublished patent application DE 10 2017 124 282.1, an opening apparatus for a motor vehicle door element has become known, comprising an electric drive and an actuating means, wherein the actuating means can be displaced by means of the drive and a gear arranged between the actuating means and the drive. The door can be moved by means of the opening apparatus, wherein a sliding element is arranged on the actuating means and interacts with a switching means so that the door movement can be detected. The actuating means is essentially formed from a driven rack with an integrated sliding element, switching means and electrical supply line. By means of the switching means between the sliding element and the body, it is possible to control the movement of the driven rack.

The devices known from the state of the art for opening a motor vehicle door after a motor vehicle lock has been unlocked make it possible for the door to be opened at least in some areas so that an operator of the motor vehicle is able to grasp the door through a gap and to open it completely. The known opening apparatuses have basically proven themselves, but reach their limits when the electrically actuated doors are opened electrically, for example on a sloping street. This is where the invention starts from.

SUMMARY OF DISCLOSURE

The object of the invention is to provide an improved opening apparatus for a motor vehicle door element. In addition, it is the object of the invention to provide an opening apparatus which enables a movement of the door element to be reliably and quickly detected. Finally, the object of the invention is to provide a structurally simple and inexpensive solution.

The object is achieved by the features of the disclosure. Advantageous embodiments of the invention are specified in the disclosure. It should be noted that the exemplary embodiments described below are not restrictive; rather, any variation possibilities of the features described in the description are possible.

According to the disclosure, the object of the invention is achieved in that an opening apparatus for a motor vehicle door element is provided, having an electric drive and an actuating means, wherein the actuating means can be displaced by means of the drive and a gear mechanism arranged between the actuating means and the drive, such that a movement of the door can be made possible, and a sensor for detecting the door movement, wherein at least one gear mechanism component is pivotably accommodated in the opening apparatus, and the pivoting movement of the gear mechanism component can be detected by means of the sensor. Due to the construction of the opening apparatus according to the invention, the movement of the door element can now be detected directly in the drive chain. The sensor detects the movement, preferably a pivot angle, of a gear mechanism component, so that a conclusion can be drawn about a relative movement between the drive movement of the electric drive and the movement of the door element. The electric drive acts directly on the gear mechanism by means of an output shaft, with the gear remaining in its initial position when the door element is driven conventionally without interference. If the door movement is now hindered, for example by manually grasping the door element, the pivotably mounted gear mechanism component will pivot. This pivoting can be detected by means of the sensor, whereby a conclusion about a movement of the door element is possible. Since the detection takes place directly in the drive chain of the door element, reliable and quick detection and thus control of the actuating means is possible.

Overload protection can be implemented by pivotable mounting of at least one gear mechanism component. In particular in the case in which the door element is subjected to an excessive load, an overload protection can be implemented by means of the pivotable gear mechanism component. An excessive load can occur, for example, if the door element cannot be opened due to the weather, that is, if the door seal is iced up, for example. On the other hand, it can also happen that, for example, a manual actuation of the door element by means of the opening apparatus takes place due to an external blocking of the door element or before the end position of the door element is reached. In the event of this excessive load, the pivotable gear mechanism component can prevent damage to the opening apparatus and can compensate for movements.

In one embodiment, a force measuring device, preferably a sensor and even more preferably a Hall-effect sensor, is accommodated in the opening apparatus in such a way that a movement of a gear mechanism carrier can be detected. The gear mechanism interacts directly with the electric drive. For example, a worm can be arranged on an output shaft of the electric drive, wherein the worm is in engagement with a worm gear. The worm gear is accommodated in a gear mechanism carrier which, on the one hand, is accommodated in a stationary manner in the opening apparatus, but on the other hand also enables a pivoting movement of at least one component of the gear mechanism. If the door element is braked while the door element is being driven, a force is introduced from the door element into the drive chain. The force emanating from the door element counteracts the driving force of the electric drive. The opposing forces cause the gear mechanism carrier to pivot, the pivoting being detectable by means of the sensor. A Hall-effect sensor has proven to be particularly advantageous since very high resolutions can be achieved with it and only small pivot angles of the gear mechanism carrier can be detected. In a preferred manner, the gear mechanism carrier moves relative to a stationary sensor, although an opposite arrangement is of course also conceivable. The Hall-effect sensor preferably interacts with a magnet.

A movement of the gear mechanism carrier can be detected by the force measuring device on the gear mechanism carrier, as a result of which an excessive load on the opening apparatus can be detected. A Hall-effect sensor is useful because it enables a non-contact detection of a movement and, in particular, the detection of small paths of the gear mechanism carrier. The force measuring device is coupled to the drive of the opening apparatus and to a controller in the motor vehicle, so that when an excessive load on the opening apparatus is detected, by means of detection of a movement by the force measuring device of the gear mechanism carrier, reversing or stopping of the drive motor of the opening apparatus can be initiated. At the same time, a control signal can also be passed to the locking means in order, for example, to stop, prevent or cancel locking. The force measuring device thus serves as a control element and prevents damage to the opening apparatus.

By the use of a sensor and preferably a Hall-effect sensor in combination with a magnet, angles less than 5°, preferably less than 3° and even more preferably angles less than or equal to 1° can be detected by means of the force measuring device. Detection of these small angles is advantageous because a movement of the gear mechanism carrier takes place. The gear mechanism carrier holds the gear mechanism components in place, at least during conventional actuation of the door element, so that sufficient force is also available to move the door element in extreme situations. An extreme situation arises, for example, when the vehicle is parked on an inclined plane and increased force is required to raise the door element. In any case, the gear mechanism carrier must store the gear mechanism components securely and in a stationary manner, at least for the usual actuation of the door element. If the door element is braked, the above-described relative movement between the actuating element and the electric drive occurs when a force threshold value in the drive chain is exceeded. In this case, the gear mechanism carrier pivots slightly. The sensor detects this pivoting even in the case of very small pivot angles.

If the gear mechanism has at least two gear stages, an advantageous embodiment of the invention can be achieved. A first gear stage can be formed, for example, from a worm arranged on the output shaft and a worm gear. It can also be advantageous if the first gear stage is accommodated in a stationary manner in the gear mechanism carrier, wherein the first gear stage cooperates with the electric drive. The worm gear is accommodated in a stationary mounting, wherein the mounting can serve at the same time as a stationary mounting and pivot axis for the gear mechanism carrier. The first gear stage thus forms the drive for the actuating means and the mounting point for the gear mechanism carrier.

If a second gear stage is accommodated in the gear mechanism carrier so as to be pivotable about an axis of the first gear stage, this results in a further variant of an embodiment of the invention. The second gear stage can, for example, be a spur gear stage which, on the one hand, is in engagement with the first gear stage and, on the other hand, drives the actuating means. For this purpose, the actuating means can for example have a toothed rack, wherein the second gear stage engages in the toothed rack and actuates the actuating means. The first and second gear stages then form a gear mechanism for driving the actuating means.

In one variant of an embodiment, the gear mechanism carrier interacts with a spring element, wherein a pivoting movement of the gear mechanism carrier can be cushioned by means of the spring element. The connection of the gear mechanism carrier to a spring element makes it possible to secure a central position of the gear mechanism carrier. A central positioning of a gear mechanism carrier is important because, on the one hand, tensile loads as well as pressure loads can occur on the actuating means. For example, an operator can pull open the door element before the locking means has been released or, for example, push the door element shut while the opening apparatus opens the door element. In both cases, the gear mechanism carrier can be resiliently deflected by means of the spring element. In this case, the gear mechanism carrier can be accommodated pivotably in the opening apparatus and pivoted around a pivot axis from a central initial position in two directions of movement. The force measuring device is advantageously arranged on the gear mechanism carrier in such a way that a movement of the gear mechanism carrier in both directions of movement can be detected by means of the force measuring device.

The spring element is advantageously a leaf spring. A leaf spring can be used, on the one hand, to provide a sufficiently high force to secure the central position of the gear mechanism carrier and, on the other hand, to provide sufficient clearance for the gear mechanism carrier. The construction of the opening apparatus according to the invention enables secure holding of the door element in combination with immediate detection of braking of the door element, wherein a high level of operational safety can be ensured at the same time.

In a further variant of an embodiment, the spring element is fixedly accommodated at a first end with the gear mechanism carrier and fixedly accommodated at a second end in the opening apparatus. The spring element, and in particular a leaf spring, stabilizes the initial position of the gear mechanism carrier and enables the actuating means to be driven reliably and permanently via the drive chain, that is to say the motor, gear and rack. The leaf spring is firmly connected to the gear mechanism carrier on one side, wherein the leaf spring can be connected to the gear mechanism carrier, for example by means of a force-fitting, form-fitting and/or bonded connection. At the end of the leaf spring opposite the gear mechanism carrier, the leaf spring is accommodated in the opening apparatus, preferably fastened in the housing of the opening apparatus. The leaf spring can be accommodated in the housing in a stationary but pivotable manner, so that the leaf spring can follow the movement of the gear mechanism carrier when it is twisted or warped.

In a further variant of an embodiment, the door element can be held by means of the actuating means. The construction of the opening apparatus according to the invention, and in particular the combination of a sensor for detecting the door movement and an actuating means by which the door element can be held, enables the door to be opened, held and thus made available to an operator. Due to the construction according to the invention, the door element can be presented to the operator, wherein at the same time it is possible to provide protection against the door element opening independently. The vehicle can also be located on a sloping road, wherein the door element can be held by means of the actuating means. If the door element is released electrically by means of the motor vehicle lock and the opening apparatus is activated, the door element opens automatically but only so far that an operator can grasp the door element and open it manually. The opening apparatus only opens the door element to such an extent that it is possible for the operator to grasp the door element, but at the same time no unintentional opening beyond the open position takes place by the opening apparatus. There is thus a high level of safety that neither endangers people nor opens the door element itself into a danger area.

The opening apparatus is used in a motor vehicle door element. The motor vehicle door element can also be, for example, a flap, hood or cover, for example for a convertible roof. It may also be necessary to hold the component that is movably arranged on the motor vehicle, for example due to environmental influences, such as wind, in order to prevent unintentional opening. The opening apparatus can thus be used where a component that is movably arranged on the motor vehicle is to be positioned for further opening. In an advantageous manner, the opening apparatus cooperates with an electrically actuatable locking system, so that a high degree of constructive freedom can be made possible in the design of the door element. For example, the door element can dispense with a door handle, which results in almost any form of an outer shape of the door element.

The opening apparatus is usually arranged in the area of the door element in such a way that the door element can be positioned by actuating the opening apparatus. The opening apparatus generates a relative movement between the body and the door element, wherein the opening apparatus is preferably arranged in the door element itself. An arrangement in the body for moving the door element is of course also conceivable. It is also conceivable that the opening apparatus is integrated into the motor vehicle lock, for example of a side door. This offers the advantage that an electrical voltage is available for the drive and/or that further functions in the motor vehicle lock can be actuated by the drive.

The electric drive preferably consists of a direct current motor which interacts with an output shaft and, for example, with the actuating means via a worm gear. One-, two- or multi-stage gears are conceivable, wherein the selection of the gear can influence the force available on the actuating means. If, for example, the opening apparatus is arranged in the door element in such a way that the opening apparatus interacts, for example, with an A-pillar of the motor vehicle and a front door, then higher forces are necessary to open the door element than if the opening apparatus is again arranged in a front door of a motor vehicle and acts on a B-pillar in the motor vehicle. If a door is opened and the opening apparatus is arranged in the area of the motor vehicle lock, lower forces are required so that higher ratios can be used.

The electric drive enables the actuating means to move. By means of the electric motor it is possible to move the actuating means in such a way that the door can be opened by the driven actuating means. The actuating means moves relative to the body and exerts a compressive force on the vehicle door element, so that the unlatched and unlocked door can be moved.

The opening apparatus preferably interacts with a motor vehicle lock which has a rotary latch and at least one pawl, wherein the locking mechanism comprising the rotary latch and at least one pawl can be unlocked electrically. In particular in the case of electrically unlockable locking systems, the operator of the motor vehicle only needs an electrical pulse to move the locking system into an unlocked, that is to say open, position. The locking system is then open so that the door or flap can be moved. The electrical opening pulse for the motor vehicle lock can be generated by means of a sensor, a key or, for example, a sensitive means, such as a touch sensor or an outside door handle with an integrated sensor.

Once the vehicle door element is unlocked, the door element can be freely pivoted in the hinges. The door may also have a door strap which can hold the door in several open positions. The door, once unlocked, can then be moved by means of the opening apparatus, wherein the movement of the vehicle door element is detectable by sensors. The entire opening process is detected. A continuous detection takes place so that the door movement can be detected at any point in time of the movement of the vehicle door element by means of the opening apparatus. A door once manually moved beyond the movement of the opening apparatus disconnects the sensor detection, so that the electric drive can be switched off or the polarity of the electric drive can be reversed so that the actuating means can be moved back to its initial position. The detection of a manual movement of the vehicle door element is explained in detail below.

BRIEF DESCRIPTION OF DRAWINGS

The invention is explained in more detail in the following with reference to the attached drawings on the basis of a preferred exemplary embodiment. However, the principle applies that the exemplary embodiment does not limit the invention, but merely represents an embodiment. The features shown can be implemented individually or in combination with further features of the description.

In the drawings.

DETAILED DESCRIPTION

Figure 1:
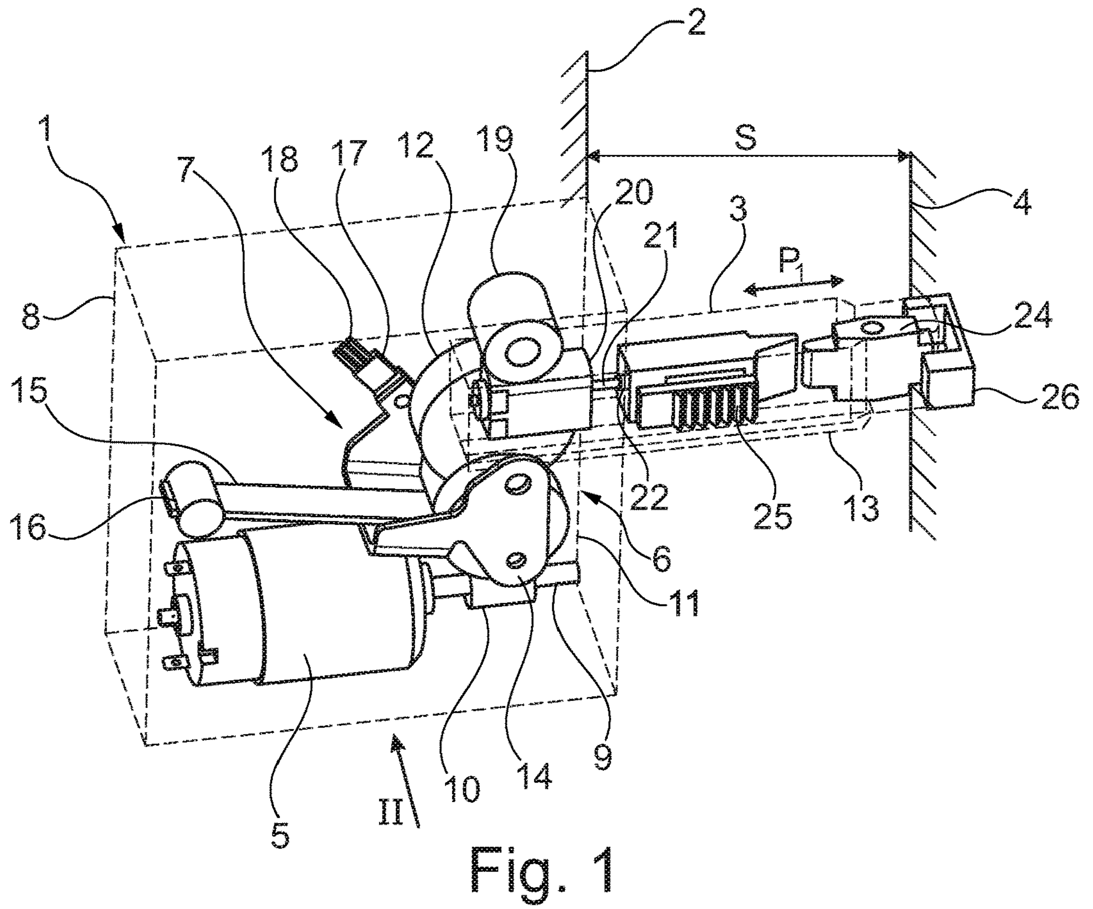
FIG. 1 is a three-dimensional view of an opening apparatus according to the invention with an extended actuating means.

FIG. 1 shows a three-dimensional view of an opening apparatus 1 with the components essential for explaining the invention. The opening apparatus 1 is arranged in a motor vehicle door element 2, wherein an actuating means 3 engages with a body 4. What is shown is the extended position of the actuating means 3, so that in this state the opening apparatus 1 has moved the door element 2 over the control path S and has positioned it. Consequently, in the position shown, the vehicle door element 2 can be grasped by an operator and can be further opened manually.

The opening apparatus has an electric drive 5, a gear mechanism 6, a force measuring device 7, a housing 8 and the actuating means 3. The drive 5 is preferably formed by an electric direct current motor with an output shaft 9 and a gear wheel 10 located on the output shaft 9. In this exemplary embodiment, the gear mechanism 6 has a multi-stage design, wherein a first gear stage 11 is in direct engagement with the output of the electric drive 5. A second gear stage 12 is driven by means of the first gear stage 11, wherein the second gear stage 12 is in engagement with a rack 13 on the actuating means 3. Consequently, the actuating means 3 can be displaced in the direction of the arrow P1 via the drive 5 and the two gear stages 11, 12. The actuating means 3 can be moved out of the housing 8 and into the housing in the direction of the arrow P1.

A gear mechanism carrier 14 forms a first fixed mounting for the first gear stage 11, wherein the second gear stage 12 is accommodated in the opening apparatus 1 in a pivotable manner by means of the gear mechanism carrier 14. In this exemplary embodiment, a leaf spring 15 is fastened to the gear mechanism carrier 14, wherein the leaf spring 15 is firmly connected to the gear mechanism carrier 14 on one side and is arranged in a fixed mounting 16 on the side opposite the gear mechanism carrier 14. To detect a pivoting movement of the gear mechanism carrier 14, a sensor 17, in particular a Hall-effect sensor, is arranged in a stationary manner in the opening apparatus 1 and is connected to a control device (not shown) by means of electrical contacts 18.

A guide means 19 is arranged in the opening apparatus 1 on the opposite side of the actuating means 3 from the toothed rack 13 in order, on the one hand, to enable smooth actuation of the actuating means 3 and at the same time to provide stable guidance for the actuating means 3. The guide means 19 can be, for example, a mounting or a roller or a combination of a mounting, roller and/or damping means.

The actuating means 3 has an electric drive 20, the output shaft 21 of which drives a spindle 22 in this exemplary embodiment, wherein the spindle 22 extends into a locking slide 23 and interacts with the locking slide 23. The locking slide 23 is slidably accommodated in the actuating means 3. The locking slide 23 cooperates with a locking lever 24, the effect of which is explained in more detail below.

An emergency actuator 25 can also be seen in FIG. 1, which in this embodiment is designed as a shaft contour, wherein the locking slide 23 can be actuated manually by means of the emergency actuator 25, so that the locking lever 24 can be disengaged manually from the body 4 and in particular from a locking contour 26.

The electrical contacting of the drives 5, 20 and the sensor 17 are not explicitly shown, wherein the electrical components 5, 17, 20 are electrically connected to a control unit (not shown) within the opening apparatus 1 and/or the motor vehicle itself.

Figure 2:
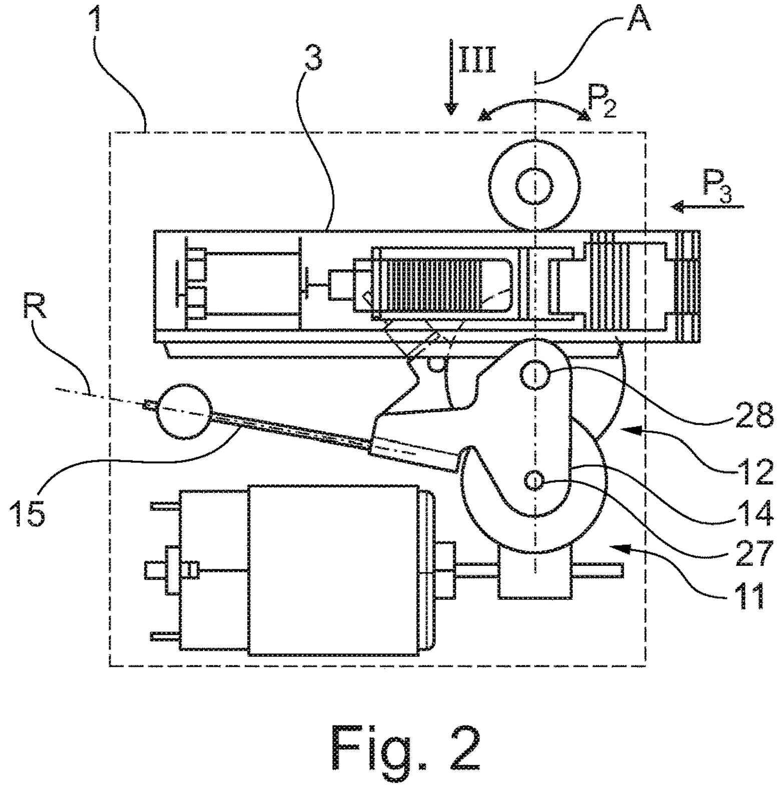
FIG. 2 is a side view of the opening apparatus with a retracted actuating means.

FIG. 2 shows a side view of the opening apparatus 1 according to the arrow II in FIG. 1, in which the actuating means 3 is shown in a retracted position. The same components are provided with the same reference signs. The axis 27 of the first gear stage 11 can be clearly seen, the axis 27 being fixedly arranged in the opening apparatus 1 and at the same time forming a pivot axis 27 for the gear mechanism carrier 14. The gear mechanism carrier 14 contains a mounting point 28 for the second gear stage 12, wherein the second gear stage 12 and in particular the mounting point 28 are shown in an initial position A. The gear mechanism carrier 14 can be pivoted about the initial position A in both directions via the axis 27 in the direction of the arrow P2. The gear mechanism carrier 14 is held in the initial position A and is secured in a spring-loaded manner by means of the leaf spring 15.

The retracted position of the actuating means 3 shown in FIG. 2 corresponds to a closed door element 2, wherein the actuating means is shown moved into the opening apparatus 1 in the direction of the arrow P3. The door element 2 is held in the closed position by means of a motor vehicle lock, for example.

Figure 3:
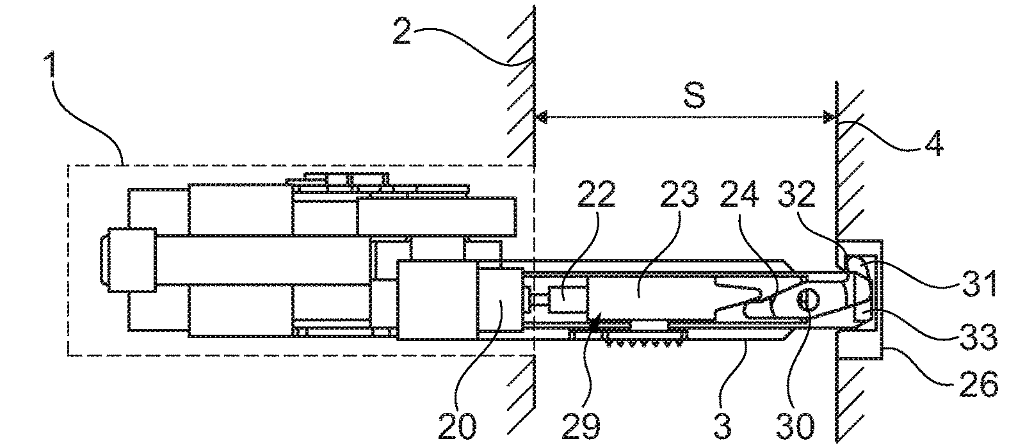
FIG. 3 is a view of the opening apparatus from a view according to the arrow III in FIG. 2, wherein the actuating means is shown in the extended state and with the locking means in engagement.

A view of the opening apparatus 1 from the direction of the arrow III in FIG. 2 is shown in FIG. 3. In FIG. 3 the actuating means 3 is shown in a maximally extended position in which the opening apparatus 1 has moved the door element 2 over the travel path or control path S. In this case the locking means 29 secures the door element 2 in the holding position. In this exemplary embodiment the locking means 29 is formed by the drive 20, the spindle drive 22, the locking slide 23 and the locking lever 24. The locking lever 24 is accommodated in the actuating means 3 so as to be pivotable about the axis 30. The locking lever 24 engages with an extension 31 in an undercut 32 of the locking contour 26. The locking lever 24 is pivoted into the locking contour 26 by the locking slide 23, wherein the locking lever 24 executes a pivoting movement about the axis 30. At the end, the actuating means 3 can have a damping means 33 in order to enable a low-noise interaction between the opening apparatus 1 and the body 4.

Figure 4:
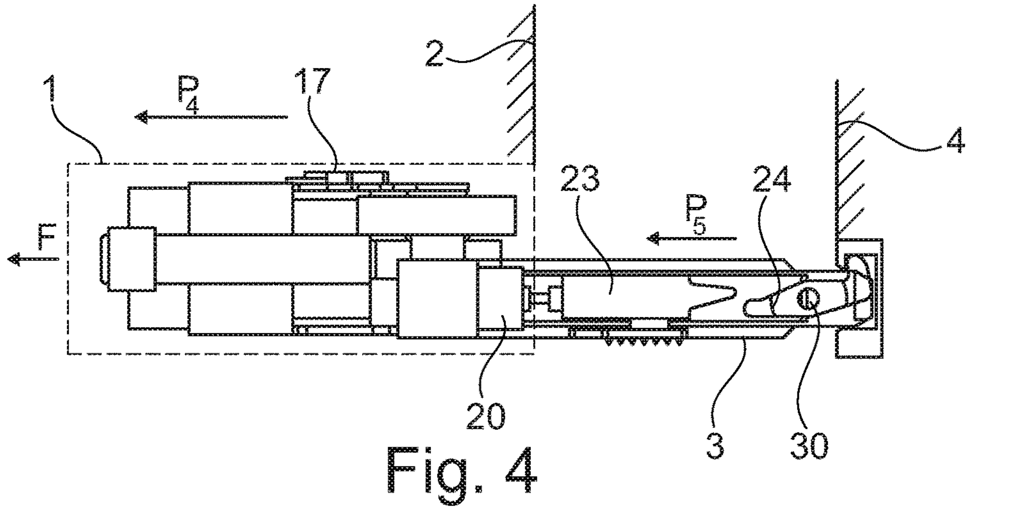
FIG. 4 is the view of the opening apparatus according to the arrow III in FIG. 2 with a released locking lever.

In FIG. 4, the position of the locking slide 23 is shown, in which, for example, the operator has manually grasped the door element 2 and applies a force F to the opening apparatus or the door element 2 in the direction of the arrow P4. This actuation of the opening apparatus 1 or the door element 2 can be detected by means of the sensor 17, as will be explained in more detail below. The movement of the opening apparatus 1 in the direction of the arrow P4 causes the electric drive 20 to be activated, so that the locking slide 23 is retracted within the actuating element 3 in the direction of the arrow P5. When the locking slide 23 is pulled back, the locking lever 24 is released and can be pivoted about the axis 30.

Figure 5:
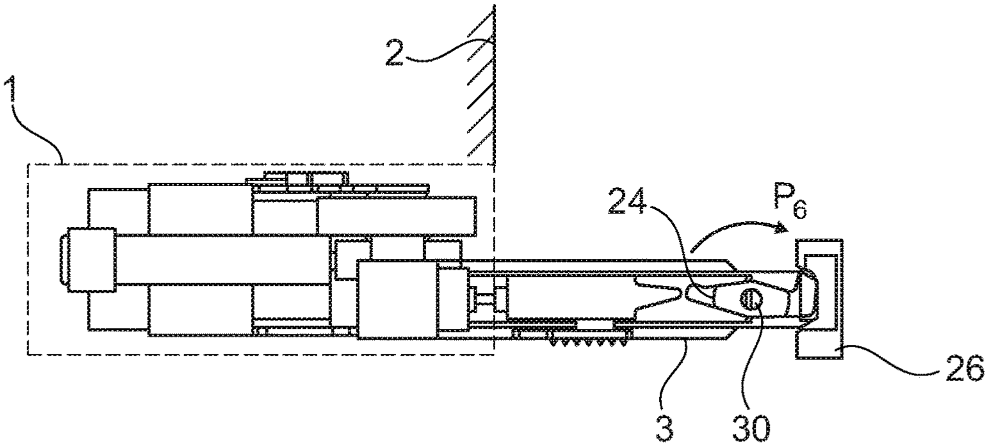
FIG. 5 is a view of the opening apparatus according to the arrow III in FIG. 2 with an actuating means extended out of the body.

FIG. 5 now shows the position of the locking lever 24 at which the locking lever 24 arrives when the door element 2 is actuated further or moved. The locking lever 24 pivots in the direction of the arrow P6 around the axis 30 in the actuating means 3 and thus disengages from the locking contour 26. The door element 2 can now be moved freely and the actuating means 3 can be moved into the opening apparatus 1.

FIG. 6 again shows a side view from the direction of the arrow II in FIG. 1 onto the opening apparatus 1. A position of the gear mechanism carrier 14 is shown which the gear mechanism carrier 14 assumes when a tensile force FZ acts on the actuating means 3. This tensile force FZ acts when the locking means 29 is engaged with the locking contour 26 and a movement in the direction of the arrow P7 is also initiated in the opening apparatus 1, for example by manually grasping and opening the door element 2. This pivoting of the gear mechanism carrier 14 can be detected by means of the stationary sensor 17. The gear mechanism carrier 14 is pivoted by the angle $\alpha\mathbf{1}$, whereby a displacement of the gear mechanism carrier 14 by the angle $\alpha\mathbf{1}$ takes place, wherein the displacement angle $\alpha\mathbf{1}$ is provided clockwise around the initial position A. In this case a pivot angle $\alpha\mathbf{1}$ of a few degrees, preferably less than 2° and even more preferably less than or equal to 1° can be set. The high-resolution sensor, which is preferably a Hall-effect sensor, can detect this pivot angle $\alpha\mathbf{1}$ and can provide it as a control signal for a control unit (not shown).

Figure 6:
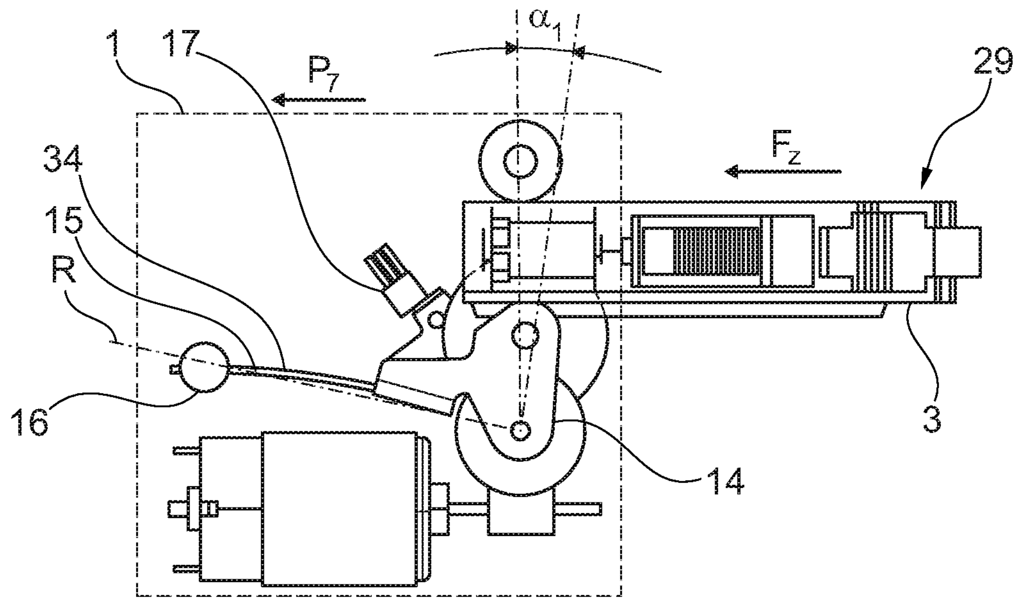
FIG. 6 is a view of the opening apparatus from the direction of the arrow II in FIG. 1, wherein a position of the opening apparatus is shown in which a tensile load acts on the opening apparatus

A curvature 34 of the leaf spring 15 around the rest position R can also be clearly seen. The leaf spring 16 is accommodated in a stationary but pivotable manner in the fixed mounting 16. FIG. 6 thus shows the situation in which the opening apparatus 1 arrives when the opening apparatus has moved the door element 2 and the door element 2 is, for example, gripped and opened by an operator. The sensor 17 detects this tensile force FZ of the operator and initiates unlocking of the locking means 29 in the form described above.

Figure 7:
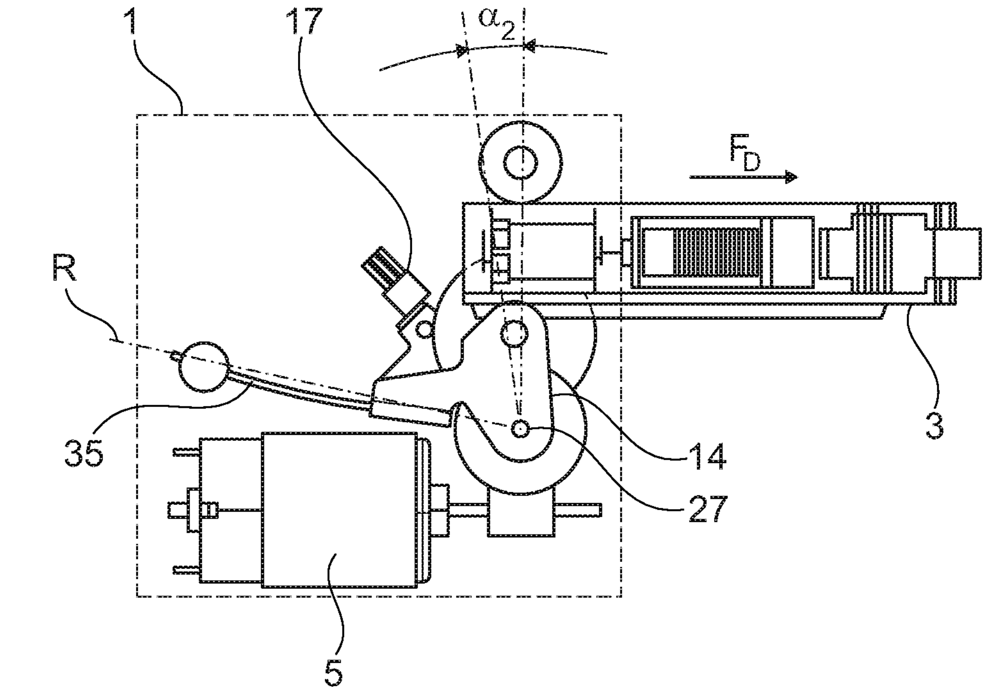
FIG. 7 is a view of the opening apparatus according to the arrow II in FIG. 1 in the event of a pressure load, that is to say a load in the direction of the body which acts on the opening apparatus.

FIG. 7 now shows the situation in which a compressive force FD is introduced into the opening apparatus 1. Due to the compressive force FD, the gear mechanism carrier 14 is pivoted counterclockwise in the direction of the angle $\alpha\mathbf{2}$ around the axis 27, which in turn can be detected by means of the sensor 17 and the relative movement between the sensor 17 and the gear mechanism carrier 14. The leaf spring 15 in turn undergoes a curvature 35. In this case, the drive 5 of the actuating means 3 would be activated by the controller and the actuating means 3 would be moved into the opening apparatus 1. This case can occur, for example, if the operator wants to manually close the motor vehicle again immediately after opening and positioning. In this case, manual closing can be supported or automatic closing can be initiated by means of the opening apparatus 1. The opening apparatus 1 then acts as a closing device for the door element 2, wherein the door element 2 is drawn into a closed position by means of the electric drive 5, the gear mechanism 10, 12, the actuating means 3 and the locking means 29. For closing, the extension 31 of the locking means 29 engages behind the locking contour 26 on the body 4.

LIST OF REFERENCE SIGNS

1 opening apparatus
2 motor vehicle door element
3 actuating means
4 body
5, 20 drive
6 gear mechanism
7 force measuring device
8 housing
9, 21 output shaft
10 gear wheel
11 first gear stage
12 second gear stage
13 rack
14 gear mechanism carrier
15 leaf spring
16 fixed mounting
17 sensor
18 electrical contacts
19 guide means
22 spindle drive
23 locking slide
24 locking lever
25 emergency actuator
26 locking contour
27, 30 axis
28 mounting point
29 locking means
31 extension
32 undercut
33 damping means
34, 35 curvature
S control path
P1, P2, P3, P4, P5, P6, P7 arrow
A initial position
F force
FZ tensile force
FD compressive force
R rest position
$\alpha\mathbf{1}$, $\alpha\mathbf{2}$ angle

The invention claimed is:

1. An opening apparatus for a motor vehicle door element, the opening apparatus comprising:
an electric drive;
an actuator, wherein the actuator is configured to be displaced by the electric drive and a gear mechanism arranged between the actuator and the electric drive to displace the actuator to move the door element;
a sensor for detecting movement of the motor vehicle door element,
wherein the gear mechanism includes at least one gear mechanism component pivotably accommodated in the opening apparatus, and
wherein the at least one gear mechanism component comprises a gear mechanism carrier; and
a spring mounted on the gear mechanism carrier,
wherein the gear mechanism carrier is biased by the spring toward a neutral position when the spring is loaded by pivoting of the gear mechanism carrier,
wherein the gear mechanism carrier is configured to pivot from the neutral position in the opening apparatus in response to displacement of the actuator, and
wherein the pivoting movement of the gear mechanism carrier from the neutral position is detected by the sensor.

2. The opening apparatus according to claim 1, wherein the sensor comprises a force measuring device accommodated in the opening apparatus.

3. The opening apparatus according to claim 2, wherein the sensor is configured to detect pivot angles of the gear mechanism carrier from the neutral position of less than 5°.

4. The opening apparatus according to claim 3, wherein the sensor is configured to detect the pivot angles of the gear mechanism carrier from the neutral position of less than 3°.

5. The opening apparatus according to claim 4, wherein the sensor is configured to detect the pivot angles of the gear mechanism carrier from the neutral position of less than 1°.

6. The opening apparatus according to claim 2, wherein the force measuring device is coupled to the electric drive.

7. The opening apparatus according to claim 2, wherein a first gear stage of the gear mechanism is connected to the gear mechanism carrier, wherein the first gear stage rotates about an axis fixedly arranged in the opening apparatus, wherein the axis of the first gear stage and a pivot axis of the gear mechanism carrier are the same, wherein the first gear stage interacts with the electric drive.

8. The opening apparatus according to claim 7, wherein a second gear stage of the gear mechanism is accommodated in the gear mechanism carrier so as to be pivotable about the axis of the first gear stage.

9. The opening apparatus according to claim 8, wherein the second gear stage includes a rack gear, wherein the actuator has a toothed rack that is engageable with the rack gear for actuating the actuator by operation of the second gear stage.

10. The opening apparatus according to claim 2, wherein the pivoting of the gear mechanism carrier is further cushioned by the spring.

11. The opening apparatus according to claim 10, wherein a first end of the spring is attached to the gear mechanism carrier and a second end of the spring is attached to the opening apparatus.

12. The opening apparatus according to claim 10, wherein the spring is a leaf spring.

13. The opening apparatus according to claim 1, wherein the gear mechanism has at least two gear stages.

14. The opening apparatus according to claim 1, wherein the electric drive acts directly on the gear mechanism via an output shaft of the electric drive.

15. The opening apparatus according to claim 14 further comprising a worm arranged on the output shaft, wherein a first gear stage of the gear mechanism includes a worm gear, wherein the worm is engageable with the worm gear.

16. The opening apparatus according to claim 1, wherein the door element is held by the actuator.

17. The opening apparatus according to claim 1, wherein the sensor is a Hall-effect sensor.

18. The opening apparatus according to claim 1, wherein the electric drive is arranged in a housing and the actuator is movable into and out of the housing.

* * * * *